(12) United States Patent
Mason

(10) Patent No.: US 6,497,361 B1
(45) Date of Patent: Dec. 24, 2002

(54) APPARATUS AND METHOD FOR DEACTIVATING ELECTRONIC ARTICLE SURVEILLANCE IN A RETAIL SELF-CHECKOUT TERMINAL

(75) Inventor: Timothy E. Mason, Buford, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/173,366

(22) Filed: Oct. 15, 1998

(51) Int. Cl.⁷ .............................................. G06K 15/00
(52) U.S. Cl. ................. 235/383; 340/568.1; 340/572.1; 705/43
(58) Field of Search .............................. 705/43, 23, 21, 705/18, 17; 345/326; 235/383; 340/568.1, 572.1

(56) References Cited

U.S. PATENT DOCUMENTS

| | | | |
|---|---|---|---|
| 3,852,716 A | * 12/1974 | Horn et al. ................... | 705/16 |
| 3,899,775 A | * 8/1975 | Larsen ......................... | 705/21 |
| 4,319,336 A | * 3/1982 | Anderson et al. ............. | 705/21 |
| 4,435,767 A | * 3/1984 | Nakatani et al. .............. | 705/23 |
| 4,679,154 A | * 7/1987 | Blanford ...................... | 235/383 |
| 4,855,908 A | * 8/1989 | Shimoda et al. .............. | 705/20 |
| 4,879,650 A | * 11/1989 | Kurimoto et al. ............. | 705/21 |
| 5,031,098 A | * 7/1991 | Miller et al. .................. | 705/21 |
| 5,057,677 A | * 10/1991 | Bertagna et al. ............. | 235/380 |
| 5,115,888 A | * 5/1992 | Schneider .................... | 186/61 |
| 5,125,465 A | * 6/1992 | Schneider .................... | 177/50 |
| 5,510,979 A | * 4/1996 | Moderi et al. ................ | 705/18 |
| 5,536,928 A | * 7/1996 | Seigel ......................... | 235/462.15 |
| 5,560,450 A | * 10/1996 | Kouno ......................... | 186/61 |
| 5,594,228 A | * 1/1997 | Swartz et al. ................ | 235/383 |
| 5,635,906 A | * 6/1997 | Joseph ......................... | 340/572 |
| 5,662,190 A | * 9/1997 | Abe .............................. | 186/61 |
| 5,729,697 A | * 3/1998 | Schkolnick et al. .......... | 705/23 |
| 5,745,705 A | * 4/1998 | Iguchi ......................... | 705/21 |
| 5,794,211 A | * 8/1998 | Goodwin, III et al. ....... | 705/23 |
| 5,794,214 A | * 8/1998 | Ebina et al. .................. | 705/24 |
| 5,952,642 A | * 9/1999 | Lutz ............................. | 235/383 |
| 5,983,197 A | * 11/1999 | Enta ............................ | 705/16 |
| 6,014,636 A | * 1/2000 | Reeder ......................... | 705/17 |
| 6,023,951 A | * 2/2000 | Maurer et al. ............... | 70/57.1 |
| 6,167,381 A | * 12/2000 | Swaine ......................... | 705/17 |
| 6,189,789 B1 | * 2/2001 | Levine ......................... | 235/383 |
| 6,315,199 B1 | * 12/2001 | Ito ............................... | 235/383 |

FOREIGN PATENT DOCUMENTS

WO    WO 9504491 A    2/1995    ............. A47F/9/04

* cited by examiner

*Primary Examiner*—Vincent Millin
*Assistant Examiner*—Richard Fults
(74) *Attorney, Agent, or Firm*—Priest & Goldstein, PLLC

(57) ABSTRACT

In a retail self-checkout system, a customer places an item to be purchased into an itemization area. The system identifies the item by using an item detector/scanner or, alternatively, through a customer input at a touchscreen display or other suitable device. The system then determines whether the item satisfies predetermined security criteria to ensure that the item in the itemization area is in fact the identified item. If the item satisfies the security criteria, the system deactivates a security tag affixed to the item to be purchase. If the item fails to satisfy the security criteria, an alarm summons store personnel to provide human intervention in the self-checkout process.

19 Claims, 5 Drawing Sheets

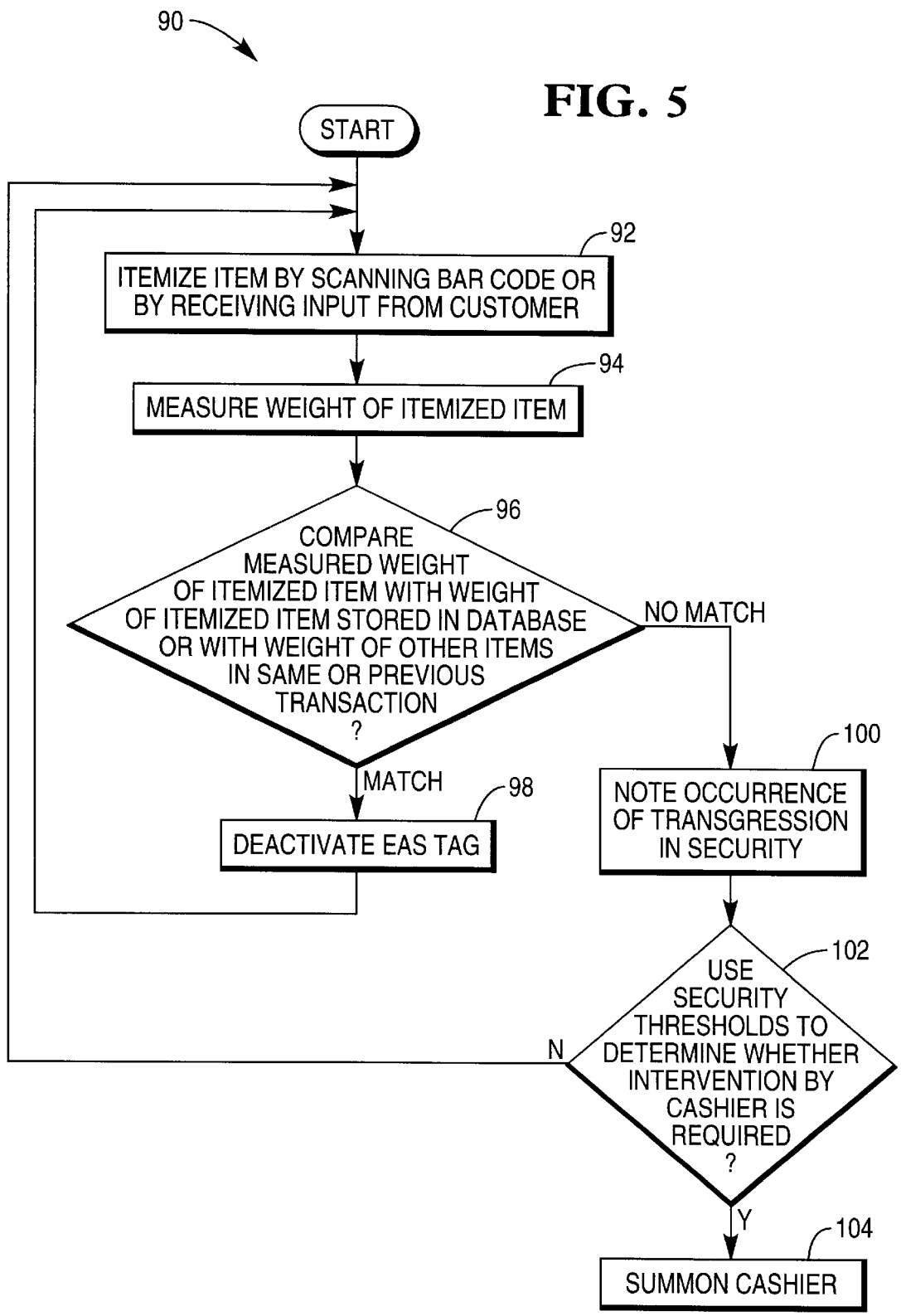

APPARATUS AND METHOD FOR DEACTIVATING ELECTRONIC ARTICLE SURVEILLANCE IN A RETAIL SELF-CHECKOUT TERMINAL

BACKGROUND OF THE INVENTION

1. Field of the Invention

The present invention relates generally to improvements in retail checkout terminals, and more particularly to advantageous aspects of an apparatus and method for deactivating electronic article surveillance in a retail self-checkout terminal.

2. Description of the Prior Art

It is becoming increasingly common for purchasers of consumer goods to pay for the goods without the need for a human cashier. For example, motorists frequently purchase gasoline at self-service stations by inserting a credit card directly into a card reader on the pumping station. Such operation has a number of advantages. First, this arrangement saves on the number of persons required to maintain and run a business establishment. Second, it decreases the incidence of employee mistake or dishonesty. Third, the customer perceives that it decreases the amount of time required to complete a typical transaction.

It would be desirable to extend the self-checkout concept to include general retail merchandise. However, in such an environment, there would be an increased concern about theft and errors in the checkout process. In present retail security systems, it is known to affix an electronic article surveillance (EAS) tag onto a retail item which triggers an alarm at the store exit if the tag is not deactivated. However, currently used security systems cannot be used in a self-checkout system because the current systems require a human cashier to ensure that the item has been properly paid for before the EAS tag is deactivated. Thus, there is a need for a security system that can be used in conjunction with a self-checkout terminal.

SUMMARY OF THE INVENTION

The present invention advantageously provides a retail self-checkout system and improvements thereto, as described in greater detail below. In a system according to the present invention, the items to be purchased are placed into an itemization area. An item detector detects the presence of the item in the itemization area, and a security checking system determines whether the item satisfies predetermined security criteria. If the item satisfies the security criteria, a deactivator deactivates an EAS security tag affixed on the item to be purchased.

Additional features and advantages of the present invention will become apparent by reference to the following detailed description and accompanying drawings.

BRIEF DESCRIPTION OF THE DRAWINGS

FIG. 5 shows a flowchart of a method according to the present invention for ensuring that an item has been properly itemized before deactivation of the EAS security tag.

DETAILED DESCRIPTION

Figure 1:
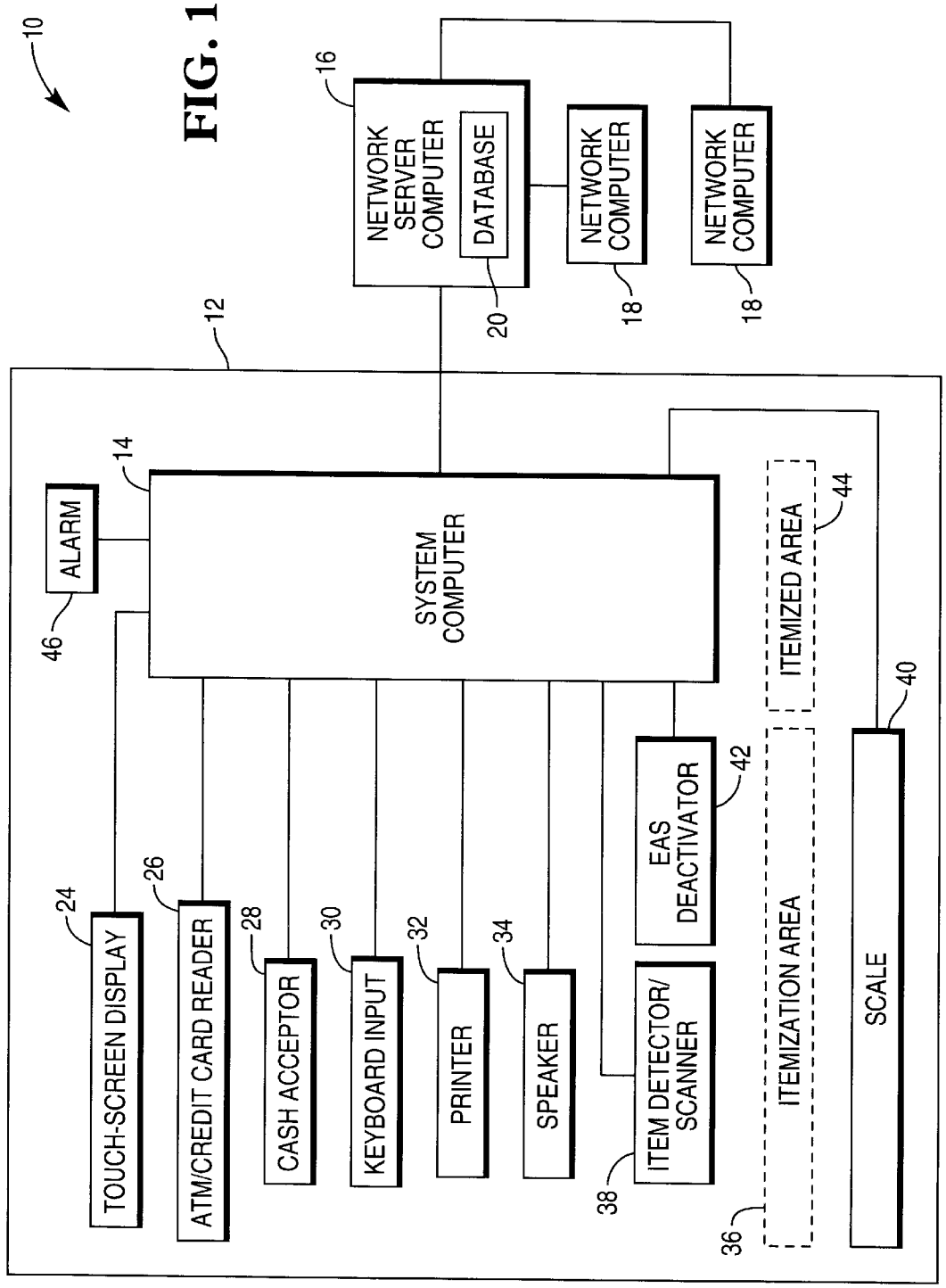
FIG. 1 shows a diagram of a self-checkout system according to the present invention.

The present invention provides a self-checkout system in which EAS tags affixed on articles to be purchased are automatically deactivated as part of a secure checkout process. FIG. 1 shows a diagram of a preferred embodiment of a self-checkout system 10 according to the present invention. System 10 includes a stand-alone unit 12 that is positioned in a retail store, proximate to the store exit. The stand-alone unit is controlled by a local system computer 14, which is connected into a network comprising network server computer 16 and other network computers 18. The server computer 16 includes a database 20, containing product and pricing information.

The system includes a touch-screen display 24. In the present embodiment, touch-screen display 24 receives input from, and provides output to, a retail customer. However, it would be possible to practice the present invention with other input and output devices known in the art. The system further includes an ATM/credit card reader 26, a cash acceptor 28, a keyboard input 30, a printer 32, and a speaker 34. In addition, the system includes an itemization area 36 for receiving the retail items to be purchased. In the present embodiment, the itemization area 36 is enclosed on three sides and the bottom, with the front and top open. Alternative embodiments are possible. For example, the itemization area 36 can be defined by rails or other framing arrangement. Preferably, the itemization area 36 should be defined in such a way that it facilitates the correct placement of the article to be checked out in the itemization area 36 by the purchaser. Also, the itemization area 36 may be enclosed to prevent the customer from interfering with the checkout process. Further, if desired, automated or semi-automated means can be provided for moving the article to be purchased into and out of the itemization area 36. This could, for example, be provided by a conveyor belt arrangement.

Each retail item is detected and scanned by item detector/scanner 38, which is located proximate to the itemization area 36. Item detector/scanner 38 reads a bar code or other mark either printed on or affixed to the article to be purchased, which allows the article to be identified for checkout purposes. As discussed below, however, it is also possible to practice the present invention with retail items that do not have scannable bar codes. An EAS deactivator 42 is provided to deactivate an EAS tag affixed to the retail item after the item has passed a security check, described below. After the EAS tag has been deactivated, the item is moved to an itemized area 44 for bagging. Stand-alone unit 12 also includes an alarm 46 for summoning store personnel, as required. In the present embodiment of the invention, the alarm comprises a three-color light mounted on top of a pole. In normal operation, the light is green. If it appears that intervention may soon be necessary, the light is flashing yellow. Finally, if intervention is required immediately, the light is flashing red.

Figure 2:
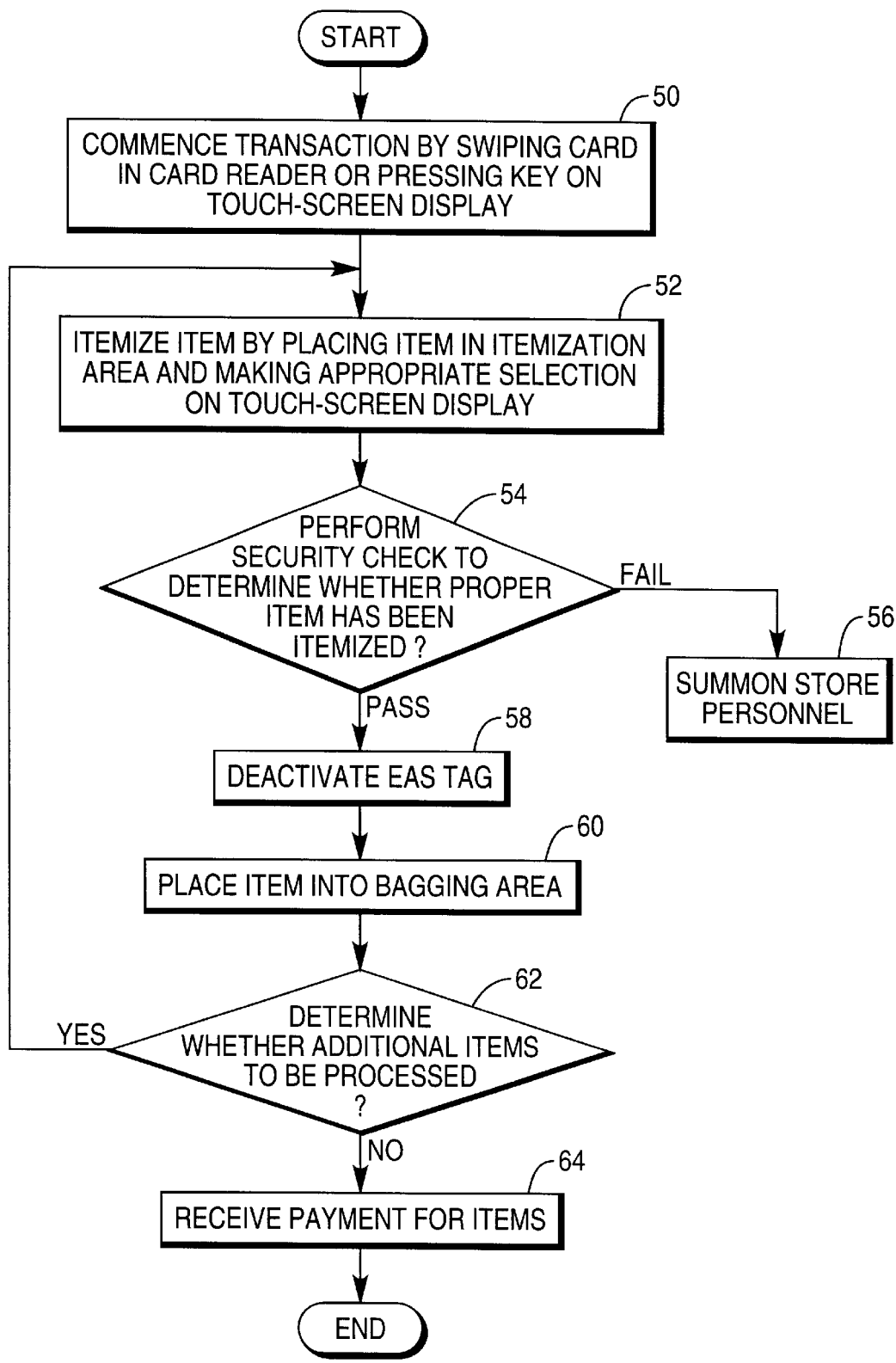
FIG. 2 shows a flowchart of a first mode of operation for the system shown in FIG. 1.

FIG. 2 shows a flowchart of one mode of operation 48 for the system shown in FIG. 1. It is contemplated that this mode will be used for itemizing articles that are not provided with scannable bar codes, for example, produce items. In the first step 50, the retail customer is prompted by touch-screen display 24 to initiate the self-checkout process by swiping a credit card or ATM card through ATM/credit card reader 26 or pressing a key on the touch-screen display 24. As shown in step 52, all of the items the customer wishes to purchase are added to the transaction (i.e. itemized) by selecting the item from a list on the touch-screen display 24. Each item is subject to a security check in step 54, described in greater detail below. If the system detects a breach in security, it summons a cashier in step 56 by means of alarm 46 to provide assistance. If the item passes the security check, its EAS surveillance tag is deactivated by EAS deactivator 42 in step 58 and the item is moved to the itemized area 44 for bagging in step 60.

Itemization continues until the system determines in step 62 that the customer has placed all the items to be purchased into the itemization area and has identified by making the appropriate input at the touch-display. If no human intervention is necessary for the transaction, then in step 64 the customer can proceed to complete the transaction by authorizing payment on a credit or debit card, or by inserting cash into cash acceptor 28. If desired, the system can be configured without cash acceptor 28.

Figure 3:
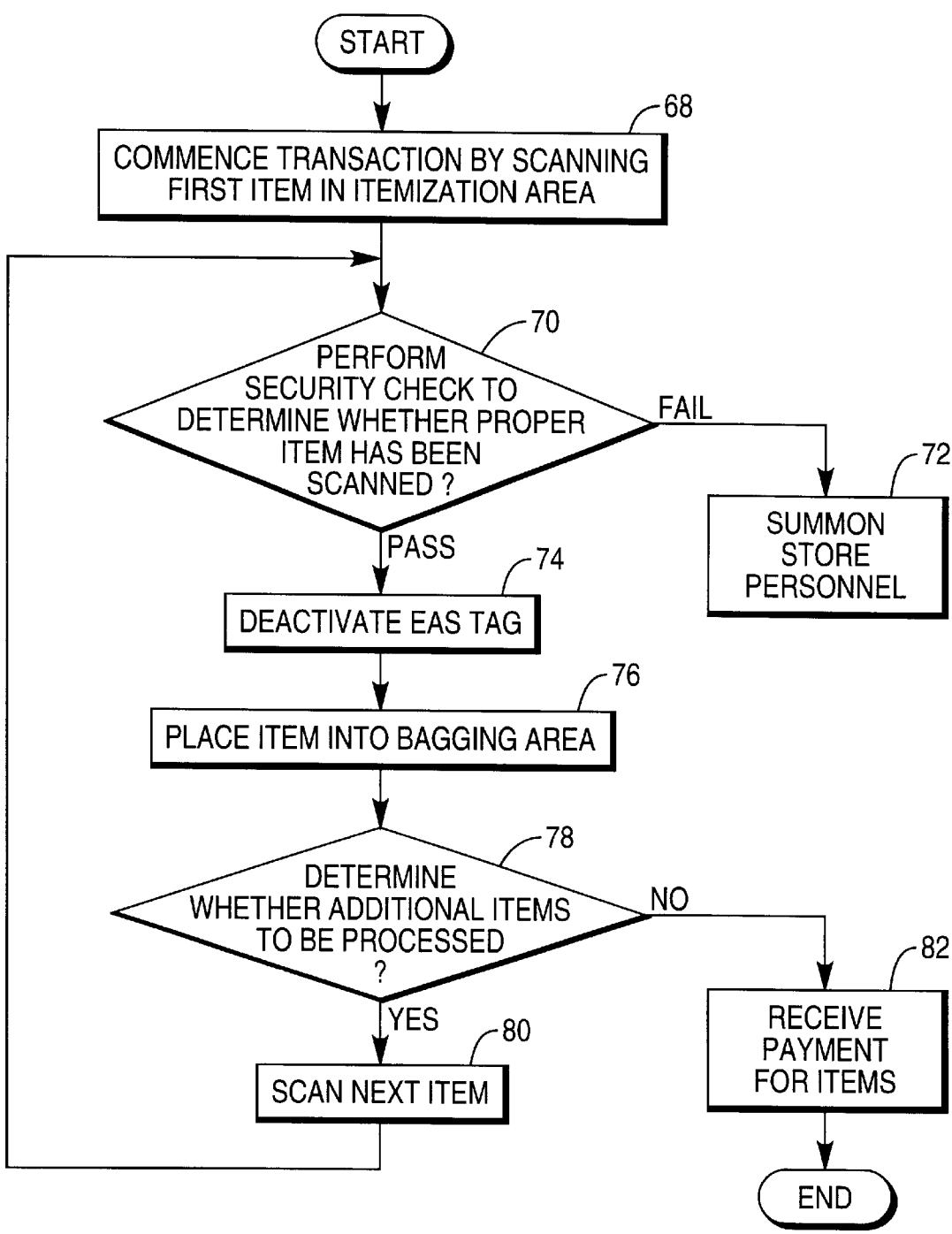
FIG. 3 shows a flowchart of a second mode of operation for the system shown in FIG. 1.
Figure 4:
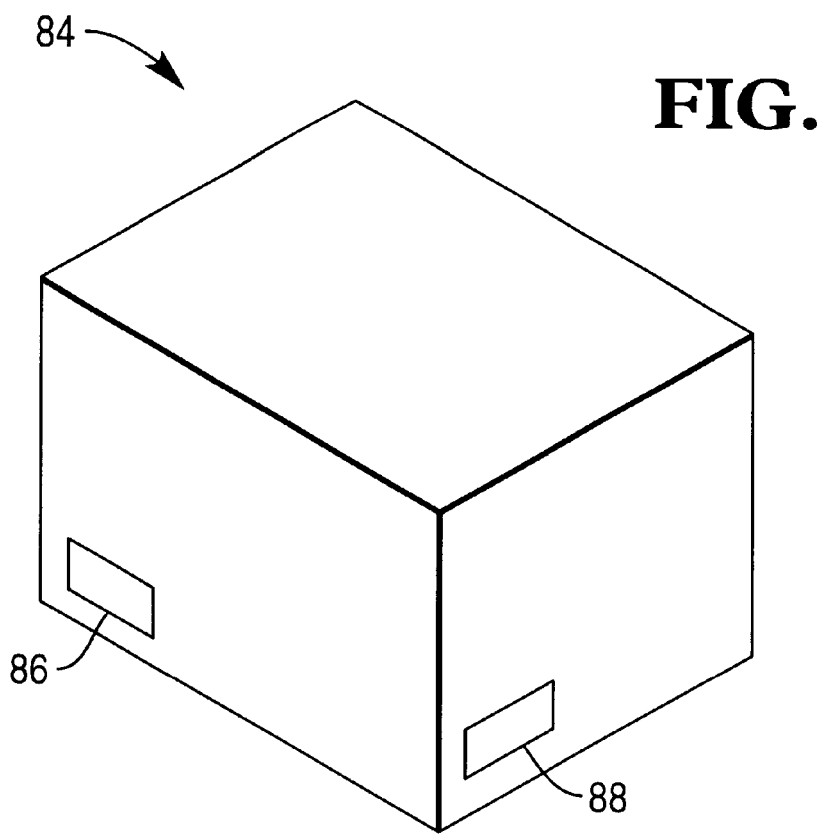
FIG. 4 shows a perspective view a packaged item suitable for checkout according to the FIG. 3 mode of operation.

FIG. 3 shows a flowchart of a second mode of operation 66 for the present invention, for use in itemizing articles that are provided with scannable bar codes. FIG. 4 shows an exemplary packaged item 84 to be processed by this second mode of operation. As shown in FIG. 4, the item includes an EAS tag 86 affixed to one side and a bar code or other identifying mark 88 printed on, or affixed to, another side. When the item is properly placed into the itemization area of the self-checkout system, the EAS tag 86 is immediately proximate to the deactivator 42, and the identifying mark 88 is immediately proximate to the item detector 38. It will be appreciated that any number of configurations are possible for the relative positions of the EAS tag 86 and the identifying mark 88.

Returning to FIG. 3, the self-checkout process in the second mode of operation 66 is commenced in step 68 by placing an item in the itemization area where its bar code scanned by item detector/scanner 38. Alternatively, the self-checkout process can be commenced by pressing a key on the touch-screen display 20. Instead of entering information on the touch-screen display, each item is itemized directly by bar codes as each item is placed in the itemization area 36. The remaining steps in this mode of operation are similar to those in the earlier mode. In step 70, the system performs a security check to determine whether the proper item has been scanned. If the system determines that the proper item has not been scanned, then the system summons store personnel in step 72. In step 74, if the item passes the security check, the EAS security tag is deactivated and, in step 76, the item is moved into the itemized area for bagging. In step 78, the system determines whether there are additional items to be scanned. If there are, the next item is scanned in step 80. The system continues to scan items until it is determined in step 78 that there are no more items to be scanned. When there are no more items, the system receives payment in step 80.

In both modes of operation, a security check is provided to ensure that the correct item has been itemized, whether the item has been itemized by an input at the touch-screen display or by scanning of a bar code. One embodiment of the present invention uses weight information in performing this function. FIG. 5 is a flowchart of this method 90.

In step 92, the first item is itemized. i.e., added to the customer's checkout list. either by scanning a bar code or by receiving input from the customer at touch-screen display 24. In step 94, the itemized item is weighed. As shown in FIG. 1, the itemization area 36 sits atop a scale 40 for this purpose. In step 96, the measured weight of the item is compared with a predetermined, known weight of the item, which in FIG. 1 is stored in the server computer 16 in database 20. Alternatively, the measured weight of the itemized item can be compared with the weight of other items in the same transaction or previous transactions, to determine whether the weight is appropriate for the merchandise that has been itemized. If the same item is scanned more than one in a transaction, the system determines whether the weights for the item are approximately the same.

In step 98 of FIG. 2, if the system determines that the merchandise that was purchased matches the merchandise placed in the itemization area, then the system will activate the EAS deactivator 42. The item will then be moved into the itemized area 44 for bagging. As discussed above, one way of accomplishing this is to provide an automatic conveyor belt that would position that item in the itemization area and then carry it away once the EAS tag has been deactivated. In another embodiment, the customer manually moves the item from the itemization area to the itemized area, prompted as necessary by touch-screen display 24 and speaker 34. The system then returns to step 92 and repeats the process for the next item.

If the system determines that the merchandise that was purchased does not match the merchandise placed in the itemization area, then in step 100 the system will note that a transgression in security has occurred, and in step 102 the security module will use predetermined security thresholds to determine whether intervention by a cashier will be required before the transaction can be completed. If cashier intervention is required, then the cashier is summoned in step 104. In such a case, a local error message can be displayed to alert the purchaser of the problem. In addition, an audio cue can be provided to the customer at speaker 34. Store personnel are summoned to the site by alarm 46. If cashier intervention is not required, the system returns to step 92 to repeat the process for the next item.

While the foregoing description includes detail which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

I claim:

1. A retail self-checkout system, comprising:

a system computer;

an itemization area for receiving from a retail self-checkout customer an article to be purchased;

an input device connected to the system computer for receiving from the retail self-checkout customer an input identifying to the system computer an article to be purchased that has been placed into the itemization area;

an EAS deactivator proximate to the itemization area for deactivating an EAS surveillance tag affixed to the article to be purchased, the EAS deactivator being connected to the system computer, the system computer activating the EAS deactivator only after performing a security check to determine, using predetermined security criteria, whether the article in the itemization area matches the article identified to the system computer by the retail self-checkout customer.

2. A system according to claim 1, further including an alarm connected to the system computer for summoning store personnel if the article being purchased does not satisfy the predetermined security criteria.

3. A system according to claim 1, further including an itemized area proximate to the itemization area for receiving the article to be purchased after the EAS surveillance tag has been deactivated.

4. A system according to claim 1, further including a card reader connected to the system computer, and located proximate to the input device, for reading an ATM or credit card.

5. A system according to claim 1, wherein the system further includes a scale proximate to the itemization area for weighing the article to be purchased, the scale being connected to the system computer, and wherein in conducting the security check, the computer compares the weight of the article with a stored weight in order to determine whether the article in the itemization area matches the article identified by the retail self-checkout customer.

6. A system according to claim 5, wherein if the weight of the article being purchased does not match the stored weight, the system notes an occurrence of a transgression in security.

7. A system according to claim 6, wherein if the system notes the occurrence of a transgression in security, the system uses security thresholds to determine whether intervention by store personnel is necessary.

8. A system according to claim 1, wherein the system further includes a scale proximate to the itemization area for weighing the article to be purchased, the sale being connected to the system computer, and wherein in conducting the security check, the computer compares the weight of the article with the weight of other items in the same or previous transactions in order to determine whether the article in the itemization area is the article identified by the retail customer.

9. A retail self-checkout system, comprising:
a system computer;
an itemization area for receiving an article to be purchased, the article having a bar code and an EAS surveillance tag;
a scanner proximate to the itemization area for scanning the bar code to identify to the system computer the article in the itemization area;
an EAS deactivator proximate to the itemization area for deactivating the EAS surveillance tag affixed to the article to be purchased, the EAS deactivator being connected to the system computer, the system computer activating the EAS deactivator only after performing a security check to determine whether, using predetermined security criteria, the article in the itemization area matches the article identified to the system computer by the scanned bar code.

10. A method for retail self-checkout, comprising:
(a) providing an itemization area for receiving an article to be purchased, the article having an EAS surveillance tag affixed thereto;
(b) receiving an input from a retail self-checkout customer identifying the article;
(c) performing a security check to determine whether, using predetermined security criteria, the article in the itemization area matches the article identified by the retail self-checkout customer;
(d) deactivating the EAS surveillance tag if the article passes the security check;
(e) summoning store personnel if the article fails the security check.

11. A method according to claim 10, wherein in step (c), the security check comprises the following substeps:
(c1) weighing the article to be purchased; and
(c2) comparing the weight of the article to be purchased with a stored weight.

12. A method according to claim 11, wherein step (c) comprises the following additional substeps:
(c3) noting the occurrence of a transgression in security if the weight of the article to be purchased does not match the stored weight; and
(c4) using security thresholds to determine whether intervention by store personnel is necessary.

13. A method according to claim 10, wherein in step (c), the security check comprising the following substeps:
(c1) weighing the article to be purchased; and
(c2) comparing the weight of the article to be purchased with the weight of other items in the same or previous transactions.

14. A method for retail self-checkout, comprising the steps of:
(a) receiving in an itemization area an article to be purchased, the article having an EAS surveillance tag affixed thereto;
(b) scanning a bar code on an article to be purchased in order to identify the article;
(c) performing a security check to determine, using predetermined security criteria for the article said criteria being independent of information contained in the scanned bar code and any optical indicia on the EAS surveillance tag, whether the article in the itemization area matches the article identified by the scanned bar code;
(d) deactivating the EAS surveillance tag if the article passes the security check; and
(e) summoning store personnel if the article fails to satisfy the predetermined security criteria.

15. A method according to claim 14, wherein in step (c), the security check comprises the following substeps:
(c1) weighing the article to be purchased; and
(c2) comparing the weight of the article to be purchased with a stored weight.

16. A method according to claim 15, wherein step (c) comprises the following additional substeps:
(c3) noting the occurrence of a transgression in security if the weight of the article to be purchased does not match the stored weight; and
(c4) using security thresholds to determine whether intervention by store personnel is necessary.

17. A method according to claim 14, wherein in step (c), the security check comprising the following substeps:
(c1) weighing the article to be purchased; and
(c2) comparing the weight of the article to be purchased with the weight of other items in the same or previous transactions.

18. The system of claim 9, wherein the system further includes a scale proximate to the itemization area for weighing the article to be purchased, the scale being connected to the system computer, and wherein in conducting the security check, the computer compares the weight of the article with a stored weight in order to determine whether the article in the itemization area matches the article identified to the system computer by the scanned bar code.

19. The system of claim 9, wherein the system further includes a scale proximate to the itemization area for weighing the article to be purchased, the scale being connected to the system computer, and wherein in conducting the security check, the computer compares the weight of the article with the weight of other items in the same or previous transactions.

* * * * *